April 27, 1948.　　　W. C. EWALDSON　　　2,440,464
CUTTING APPARATUS
Filed May 8, 1946　　　3 Sheets-Sheet 1

INVENTOR
W.C. EWALDSON
BY
*W.C. Parnell*
ATTORNEY

April 27, 1948.   W. C. EWALDSON   2,440,464
CUTTING APPARATUS
Filed May 8, 1946   3 Sheets-Sheet 2
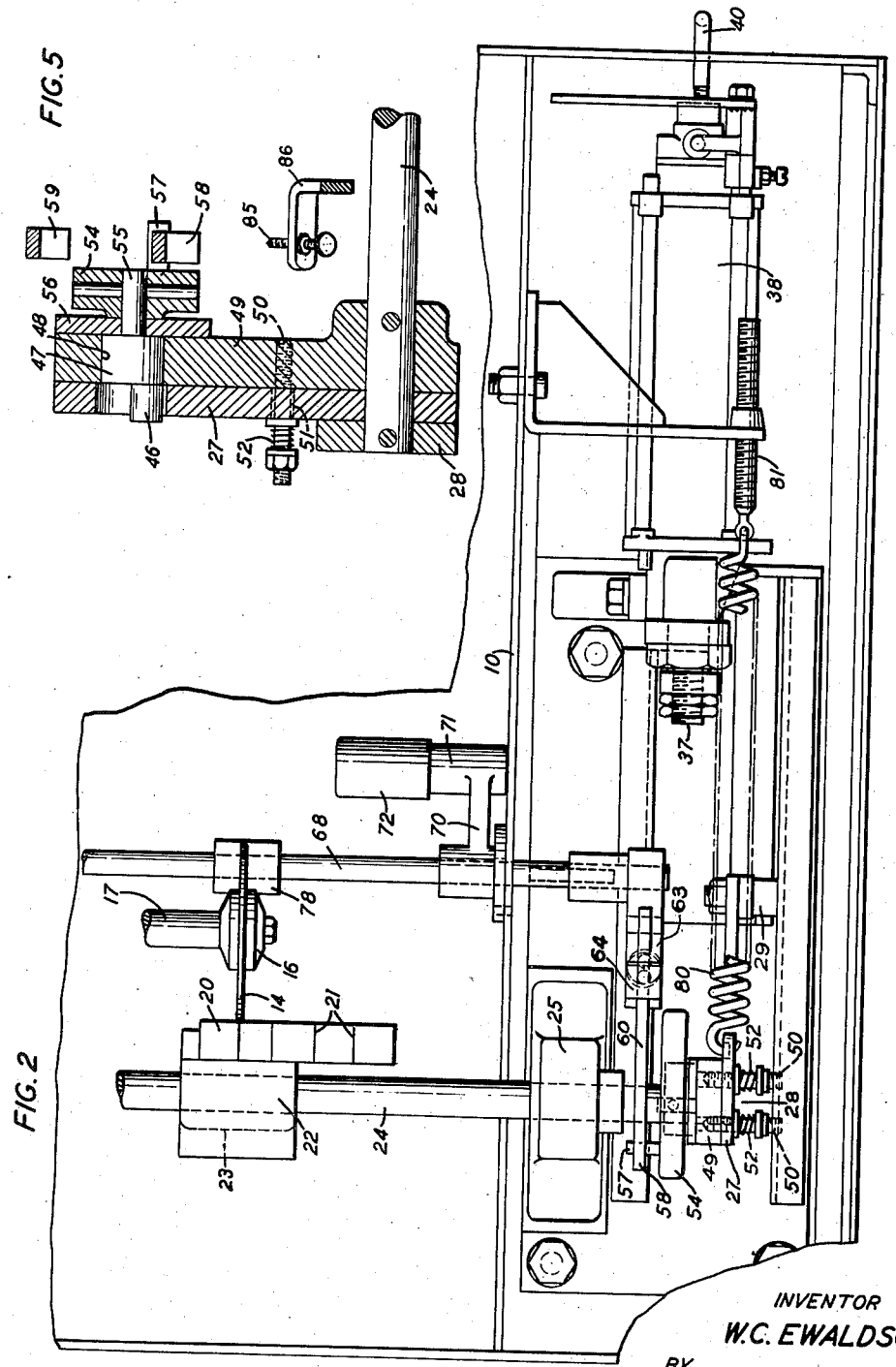
INVENTOR
W.C. EWALDSON
BY
W.C. Parnell
ATTORNEY April 27, 1948. W. C. EWALDSON 2,440,464
CUTTING APPARATUS
Filed May 8, 1946 3 Sheets-Sheet 3
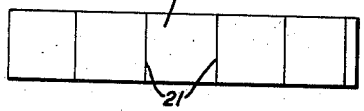
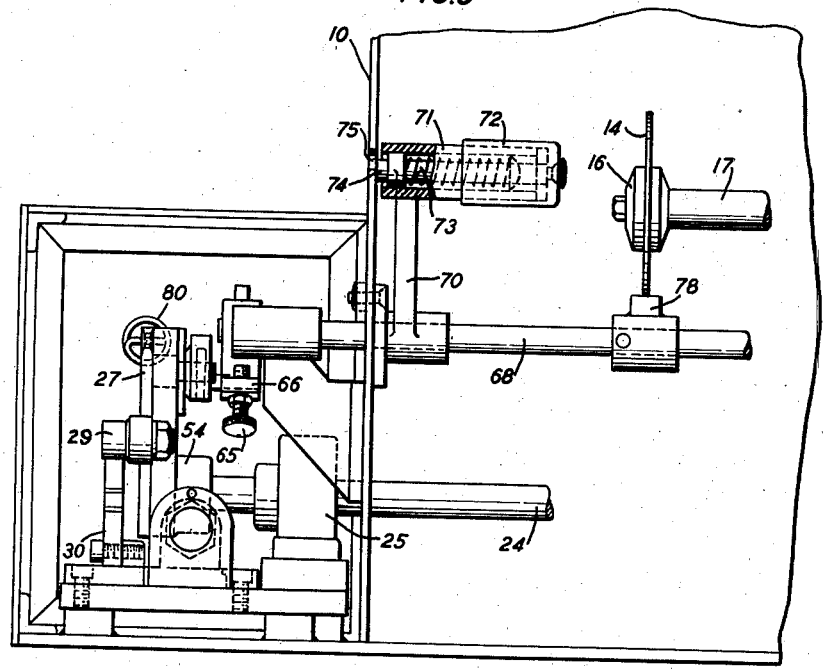
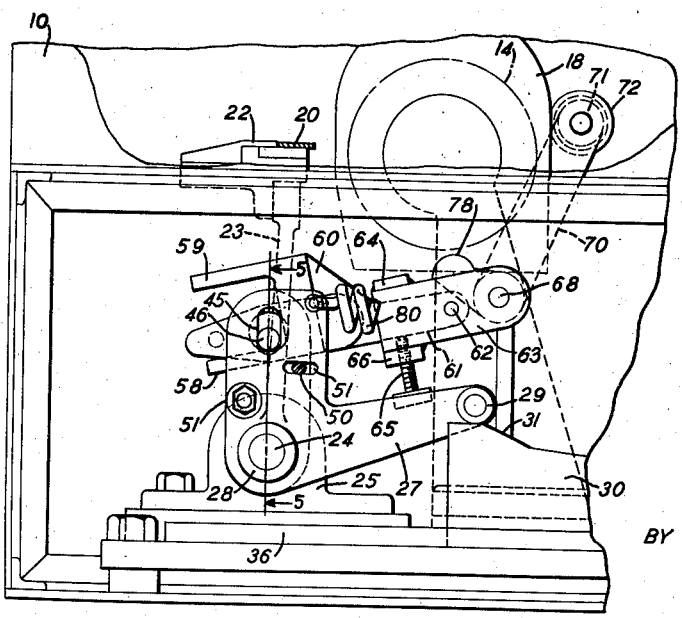
INVENTOR
W.C. EWALDSON
BY
W.C. Parnell
ATTORNEY Patented Apr. 27, 1948

2,440,464

UNITED STATES PATENT OFFICE 2,440,464

CUTTING APPARATUS

Waldemar C. Ewaldson, Millington, N. J., assignor to Western Electric Company, Incorporated, New York, N. Y., a corporation of New York Application May 8, 1946, Serial No. 668,056

6 Claims. (Cl. 125—13)

This invention relates to cutting apparatus and more particularly to apparatus for cutting quartz crystals.

During the various steps in the method of manufacturing quartz crystal plates for use in the communication arts, cutting operations are performed in producing plates of the desired sizes from the mother stone. The commercial diamond saws are usually employed for the cutting operations and these saws decrease in diameter by continued use shortening their useful lives unless adjustments may be made in the relative movement of the saw and work support to make possible further use of the saws. Another feature, which has proven important not only in lengthening the life of a saw of this type, but in obtaining satisfactory results from the saw in cutting quartz crystals, is the controlling of the relative movement of the saw and work support to eliminate chipping or breaking of the crystal.

An object of the invention is to provide a cutting apparatus which is highly efficient in operation and accurately variable to cause relative movement of a cutter and work support at varied speeds between variable limits to cut work, particularly quartz crystals into given lengths.

Broadly, the invention comprises a rotatable cutter and a work support with operating means therefor to move the work support relative to the cutter between variable limits and at varied speeds to cause the cutter to cut through the work.

More specifically, the work support is mounted upon a bracket which is fixed to a shaft with the shaft fixedly supporting a cam lever actuated by a cam movable at a constant speed in a given path to cause rocking movement of the shaft and work support at varied speeds relative to the cutter. The varied speeds are accomplished by the angular positions of surface portions of the cam with respect to the path of the cam, controlling the rocking motion of the shaft under the force of a spring which holds the cam lever or its roller in engagement with the surface portions of the cam. During action of the cam in one direction, by operation of an air cylinder, the work is fed to the cutter slowly during the first portion of the cut, then more rapidly to a point short of the completion of the cut, and finally less rapidly again during the remainder of the cutting operation. It has been found equally advantageous in removing the work from the cutter to carry out these variable movements in reverse order and this is accomplished by the same cam surface portions while the cam is returning to its normal or starting position by operation of the air cylinder.

At different intervals during the life of one cutter as it decreases in diameter during continued use, the limits of the work support may be varied by a mechanism which, when actuated, will check with the exact diameter of the cutter and accurately vary the given limits of the work support with respect to the cutter. Through this mechanism, the operator may continue to use the cutter until it has been reduced to such a small diameter that it will no longer satisfactorily cut through the work.

Other objects and advantages will be apparent from the following detailed description when considered in conjunction with the accompanying drawings, wherein Fig. 1 is a fragmentary side elevational view of the cutting apparatus;

Fig. 2 is a fragmentary top plan view of the cutting apparatus;

Fig. 3 is a fragmentary detailed view of the apparatus;

Fig. 4 is a fragmentary side elevational view illustrating the normal position of the control mechanism for the apparatus;

Fig. 5 is an enlarged fragmentary sectional view taken along the line 5—5 of Fig. 4; and Fig. 6 is a top plan view of a crystal marked for cutting.

Figure 1:
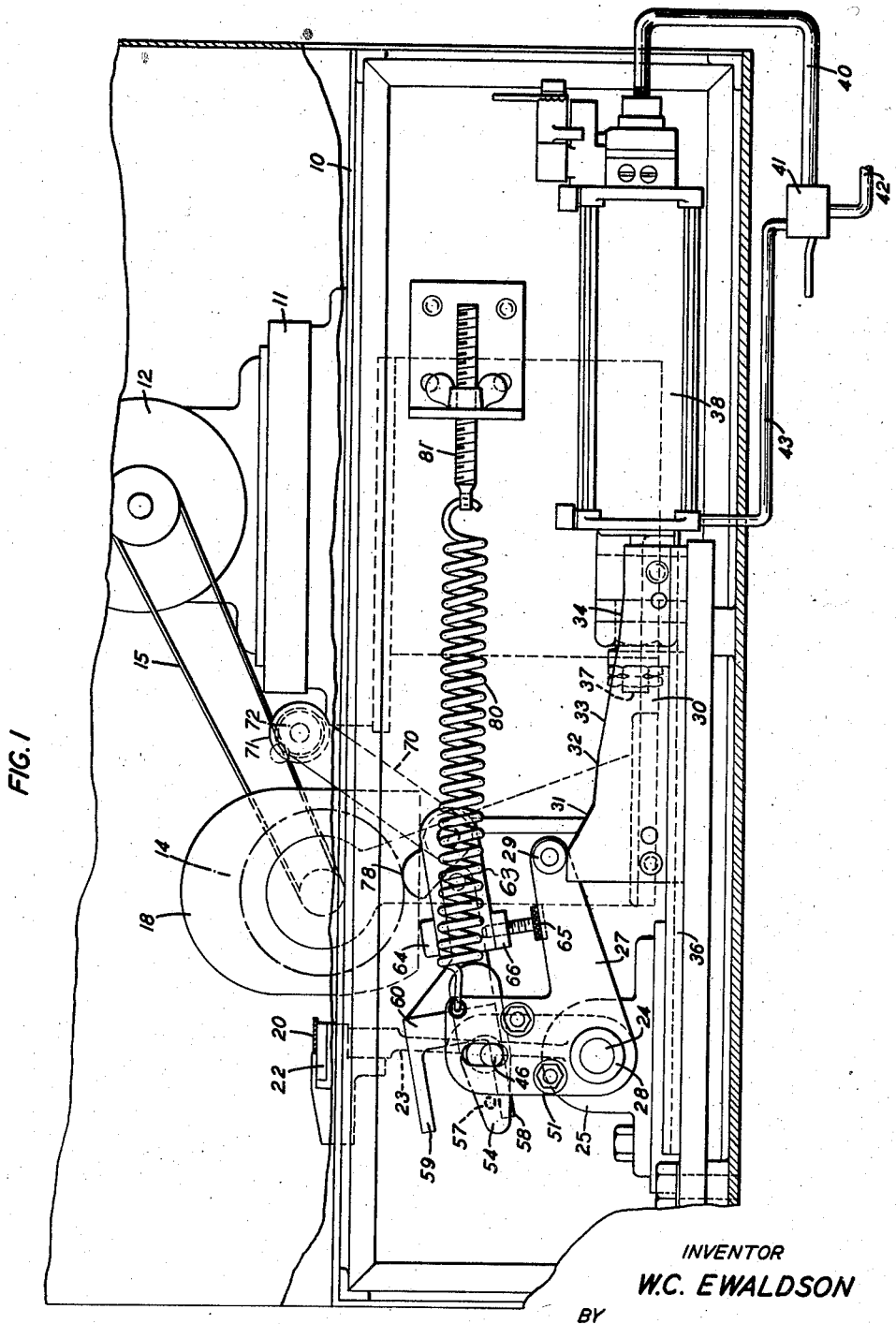

Referring now to the drawings, a housing 10 is provided for the major portion of the control mechanism, suitable means 11 being provided upon the housing to support a motor 12. The motor 12 drives a cutter 14 through a belt and pulley connection 15, the cutter being at a fixed position and removably mounted at 16 upon its shaft 17. A suitable guard 18 shown in only Figs. 1 and 4 is provided for the cutter. In the present embodiment, the quartz crystal structure, which hereinafter will be referred to as the crystal or work, has been cut into portions of desired thickness and width, this apparatus being employed to cut the crystal 20 illustrated in Fig. 6 into predetermined lengths. The crystal may be marked by lines 21 designating where the cuts are to be made. The work or crystal 20 is then placed upon a holder or work support 22 which is mounted upon the upper end of a bracket 23. The lower end of the bracket 23 is fixedly mounted upon a shaft 24 supported in suitable bearings 25, only one of which is shown in the drawings. A cam lever 27 is mounted upon the outer end of the shaft 24 free for rocking movement on the shaft, the lever being held in place by a collar 28 fixedly mounted on the end of the shaft. One arm of the lever 27 supports a cam roller 29 which rides upon the upper surface of a cam 30. The upper surface of the cam 30 is divided into portions 31, 32, 33 and 34 which function in controlling the speed of movement of the crystal 20 relative to the cutter 14. The cam 30 is mounted for longitudinal movement in a guide 36 and is connected to a piston rod 37 of an air cylinder 38. The air cylinder 38 is fixedly mounted in the housing 10 and is connected through a fluid line 40 and a foot controlled valve 41, to a supply line 42 for a supply of air under pressure necessary for the operation of the air cylinder. The valve 41 and its connections with the air cylinder are of the type that will normally open a fluid line 43 to the front or left of the cylinder functioning to return the cam 30 to its normal or starting position and to hold the cam in this position until the valve 41 is actuated to exhaust air in front of the piston in the cylinder and open the air lines 42—40 to cause movement of the cam 30 to the left (Fig. 1).

The vertical arm of the cam lever 27 has an elongate opening 45 therein to receive an eccentric portion 46 of an adjusting element 47. The main or central portion of the adjusting element is cylindrical in general contour and is mounted for rotation or rocking movement in an aperture 48 of an arm 49 which is fixedly mounted on the shaft 24. The arm 49 carries spaced screws 50 which extend through elongate openings 51 in the vertical arm of the lever 27. Springs 52 carried by the screws 50 between washers thereon apply sufficient force, which may be varied by adjustment of the screws, to connect the cam lever 27 for normal movement with the arm 49.

The cam lever 47 may be adjusted relative to the arm 49 to vary the rocking motion of the shaft 24 by rotation of the adjusting element 47. The mechanism for adjusting the element 47 includes a member 54 pinned to a concentric projection 55 of the element and spaced from the arm 49 by a cover plate 56 which serves to retain the element in position in the arm 49. The member 54 carries a pin 57 spaced from the projection 55 and positioned between the jaws 58 and 59 of a yoke 60. The yoke 60 has a reduced portion 61 pivotally supported at 62 on a lever 63. A projecting lug 64 on the top of the lever 63 is positioned to engage the reduced portion 61 of the yoke 60 and an adjustable screw 65 is carried by a projection 66 at the bottom or under surface of the lever 63 to also engage the reduced portion 61 of the yoke. The lever 63 is fixedly mounted upon a shaft 68 which is supported for rocking movement in suitable bearings (not shown). A hand lever 70 is fixedly mounted upon the shaft 68 externally of the housing 10 and carries a hollow handle 71, a movable portion 72 of which telescopes the main portion 71 and is normally urged to the left (Fig. 3) by a spring 73. The spring 73 is concentric with a pin 74 which has one end fixed to the handle portion 72, the other end being receivable in an aperture 75 of the housing 10. When the pin 74 is in the aperture 75, the mechanism linked with its shaft 68 is in its normal position, the pin being free to move along the adjacent surface of the housing when removed from the aperture 75.

A finger 78 is mounted upon the shaft 68 adjacent the cutter 14 and is moved with the rocking of the shaft 68 into engagement with the cutter when it is desirable to make adjustment in the feeding mechanism or the limits between which the work support is moved.

During normal operation of the apparatus, the crystal 20 is placed on the work support 22 with one of its lines 21 in alignment with the cutter 14. While the crystal 20 is held in place on the work support, the operator actuates the valve 41 causing operation of the air cylinder 38 to move the cam 30 at a constant speed to the left (Fig. 1) successively moving the portions 31, 32, 33 and 34 of the cam beneath the cam roller 29. A spring 80 having one end connected to the cam lever 27, and the other end connected to an adjusting screw 81, provides a variable force to rock the cam lever 27, the arm 49, the shaft 24 and the bracket 23 to move the work support with the crystal from its loading position through its cutting position.

During the first movement of the work support, it is moved rapidly as the cam roller 29 (Fig. 1) rides down the cam portion 31. The speed of movement of the work support is reduced to a slow speed as the cam roller 29 rides on the cam portion 32 prior to the crystal reaching the cutter which slow speed is maintained until the initial portion of the cut is made in the crystal. After this has been accomplished, the speed of movement of the work support relative to the cutter is increased as the cam roller rides on the cam portion 33 and continues at this higher speed to a position short of the exit end of the cut. The speed of movement of the work support is then reduced as the cam roller rides on the cam portion 34 so that the final cut through the crystal is made with the crystal moving at a slow speed comparable with the speed of movement during the initial cut into the crystal. When the first complete cut has been made in the crystal, the operator removes his foot from the valve 41 allowing the valve to return to its normal position to exhaust air from back of the piston and to open the fluid line 43 to the supply line 42 to return the cam to its normal position shown in Fig. 1. During the return movement of the cam, the work support travels at the same speeds it travelled during its feeding movement, the crystal parts being held on the work support during the return movement thereof to the loading position. The operator may then dispose of the first cut crystal member and adjust the remaining crystal for the second cutting operation.

The cutting operations may continue until the cutter 14 has decreased in diameter by continued use so that it is necessary to make adjustment in the feeding mechanism. This adjustment is made while the cutter is idle, the operator removing the pin 74 from the aperture 75 and rocking the hand lever 70 to the position shown in Figs. 1 and 3. The hand lever 70 is thus moved until the finger 78 engages the periphery of the cutter 14. During this movement, the cam lever 27 is held against rotation by the cam 30 and the spring 80. When the shaft 68 is rocked during movement of the lever 70 to position the finger 78 in engagement with the periphery of the cutter 14, the lever 63 will be rocked clockwise moving the yoke 60 in the same direction by its engagement with the screw 65, causing the jaw 58 of the yoke to engage the pin 57 (Figs. 2 and 5) and rock the member 54 a given distance depending upon the movement of the finger 78. This rocking motion of the member 54 will rock the adjusting element 47 through its projection 55, the eccentric portion 46 causing relative movement of the arm 49 and the cam lever 27. Actually the arm 49 is moved against the force of the springs 57 on the screws 56. When this adjustment has been completed, the hand lever 70 is returned to its normal position where the pin 74 will again enter the aperture 75 rocking the shaft 68 a sufficient distance to free the finger 78 from the cutter 14 and rock the lever 63 with the yoke 60 counterclockwise until the jaws 58 and 59 are spaced from the pin 57.

During the next cutting operation, the work support will be moved between limits spaced the same distance apart both of which, however, have been moved toward the axis of the cutter a distance equal to the wear on the cutter. These adjustments may be made when thought advisable by the operator until the cutter has been reduced to a diameter no longer suitable for the cutting operations desired. At this time a new cutter may be mounted upon the shaft 17 and the work support may be returned to its initial starting position to move between the fixed given limits through the same adjusting mechanism which has been employed to advance the given limits of the work support toward the axis of the cutter. This may be accomplished by removing the pin 74 from the aperture 75 and rotating the handle 70 counterclockwise to move the lever 63 until the projection 64 engages the reduced portion 61 of the yoke 60 causing the jaw 59 to engage the pin 57 and move it to its starting or initial position governed by an adjustable screw 85 mounted in a fixed bracket 86. Movement of the pin 57 will rotate the member 54 rotating also the projection 55 upon which it is mounted and the adjusting member 47 causing the arm 49 to return to its original position with respect to the cam lever 27 by the eccentric member 46. The apparatus is again in readiness to begin its cutting operations.

During normal operation of the apparatus the work support will move at the speeds controlled by the cam 30 through the cam roller 29 and the associated mechanism. If, however, the cutter should become dull prior to the termination of its usefulness, as far as its effective diameter is concerned, so that it will not cut the crystal at the feeding speeds, the cam roller 29 will leave the cam against the force of the springs 80. This is an added protective feature in the cutting apparatus.

Although specific improvements of the invention have been shown and described, it will be understood that they are but illustrative and that various modifications may be made therein without departing from the scope and spirit of this invention as defined by the appended claims.

What is claimed is:

1. In a cutting apparatus, a cutter rotatable about a fixed axis, a movable support for work to be cut in two by the cutter, means active to force the support with the work at high speed toward the cutter, and means to control the movement of the support to cause it to move slowly during the beginning of the cutting operation into the leading edge of the work and to subsequently cause the support to increase its speed of movement while cutting through the main body of the work.

2. In a cutting apparatus, a cutter rotatable about a fixed axis, a movable support for work to be cut thereby, means active to force the support with the work at selected variable speeds toward the cutter, and a cam movable at a constant speed and having angularly positioned surfaces to respectively control the movement of the support with the work at a rapid speed as the work approaches the cutter, at a low speed during the initial portion of the cut, at a higher speed during the subsequent cutting of the work to a position short of the exit end of the cut and at a lower speed during the final portion of the cutting operation.

3. In a cutting apparatus, a cutter rotatable about a fixed axis, a movable support for work to be cut thereby, means active to force the support with the work at selected variable speeds toward the cutter, a cam movable at a constant speed to effect movement of the support with the work at a variable speed relative to the cutter, and fluid operated means to move the cam.

4. In a cutting apparatus, a cutter, decreasing in radial dimensions with wear, rotatable about a fixed axis, a shaft, a support for work to be cut mounted thereon, an element disposed on the shaft and movable between fixed limits, a member fixedly mounted on the shaft and connected to the element for movement therewith to rock the work support with the shaft between given limits, and a mechanism movable a distance limited by the radial dimension of the cutter to vary the position of the member with respect to the element to vary the given limits of the work support relative to the cutter.

5. In a cutting apparatus, a cutter, decreasing in radial dimensions with wear, rotatable about a fixed axis, a shaft, a support for work to be cut mounted thereon, an element disposed on the shaft and movable between fixed limits, a member fixedly mounted on the shaft, an eccentric unit connecting the member with the element for movement of the member with the element to rock the work support with the shaft between given limits, and means to actuate the eccentric unit to vary the position of the member relative to the element to vary the given limits of the work support relative to the cutter as the cutter decreases in radial dimensions.

6. In a cutting apparatus, a cutter, decreasing in radial dimensions with wear, rotatable about a fixed axis, a shaft, a support for work to be cut mounted thereon, an element disposed on the shaft and movable between fixed limits, a member fixedly mounted on the shaft and connected to the element for movement therewith to rock the work support with the shaft between given limits, a mechanism movable a distance limited by the radial dimension of the cutter to vary the position of the member with respect to the element to vary the given limits of the work support relative to the cutter, and means cooperating with the said mechanism to return the member to its original position with respect to the element to return the support to its initial limits.

WALDEMAR C. EWALDSON.

REFERENCES CITED

The following references are of record in the file of this patent:

UNITED STATES PATENTS

| Number | Name | Date |
| --- | --- | --- |
| 1,341,818 | Onsrud | June 1, 1920 |
| 1,385,731 | Taylor | July 26, 1921 |
| 1,933,055 | Hague | Oct. 31, 1933 |
| 2,077,359 | Flygare | Apr. 13, 1937 |
| 2,144,205 | Landy | Jan. 17, 1939 |